United States Patent
Whear et al.

(10) Patent No.: US 8,404,378 B2
(45) Date of Patent: Mar. 26, 2013

(54) BATTERY SEPARATOR FOR A STORAGE BATTERY

(75) Inventors: J. Kevin Whear, Utica, KY (US); Eric H. Miller, Philpot, KY (US); Salvatore Cardillo, Turckheim (FR); Daniel Dreyer, Mackenheim (FR)

(73) Assignee: Daramic LLC, Charlotte, NC (US)

( * ) Notice: Subject to any disclaimer, the term of this patent is extended or adjusted under 35 U.S.C. 154(b) by 122 days.

(21) Appl. No.: 12/768,821

(22) Filed: Apr. 28, 2010

(65) Prior Publication Data

US 2011/0003190 A1    Jan. 6, 2011

Related U.S. Application Data

(60) Provisional application No. 61/174,030, filed on Apr. 30, 2009.

(51) Int. Cl.
*H01M 2/18* (2006.01)

(52) U.S. Cl. ........ 429/146; 429/129; 429/131; 429/136; 429/139

(58) Field of Classification Search ............. 429/143, 429/129, 131, 136, 139, 247, 249, 254, 145, 429/147

See application file for complete search history.

(56) References Cited

U.S. PATENT DOCUMENTS

| | | | |
|---|---|---|---|
| 2,540,844 A | 2/1951 | Strauss | |
| 2,837,592 A * | 6/1958 | Dowse et al. | 429/147 |
| 3,351,495 A | 11/1967 | Larsen et al. | |
| 4,264,691 A | 4/1981 | O'Rell et al. | |
| 4,407,063 A * | 10/1983 | Johnson | 29/623.2 |
| 4,927,722 A | 5/1990 | Bohnstedt et al. | |
| 5,230,843 A | 7/1993 | Howard et al. | |
| 5,264,304 A | 11/1993 | Kragness et al. | |
| 5,384,211 A | 1/1995 | Choi et al. | |
| 5,679,479 A | 10/1997 | Young et al. | |
| 5,776,630 A | 7/1998 | Bohnstedt | |
| 5,789,103 A | 8/1998 | Young et al. | |
| 6,410,183 B2 | 6/2002 | Weerts et al. | |
| 7,445,735 B2 | 11/2008 | Miller et al. | |
| 2008/0118827 A1 | 5/2008 | Call et al. | |
| 2008/0268345 A1 | 10/2008 | Zhang et al. | |

FOREIGN PATENT DOCUMENTS

| | | |
|---|---|---|
| EP | 0899801 A1 | 3/1999 |
| EP | 0994518 A1 | 4/2000 |
| JP | 2000182593 | 6/2000 |
| WO | WO 94/20995 A2 | 9/1994 |
| WO | WO 00/63983 | 10/2000 |
| WO | WO 01/13442 | 2/2001 |

OTHER PUBLICATIONS

U.S. Appl. No. 61/253,096, filed Oct. 20, 2009, Miller et al.

* cited by examiner

*Primary Examiner* — Basia Ridley
*Assistant Examiner* — Heng Chan
(74) *Attorney, Agent, or Firm* — Hammer & Associates, P.C.

(57) ABSTRACT

A battery separator for a lead acid (storage) battery is made from a thermoplastic sheet material. The sheet material has a central region flanked by peripheral regions. The central region includes a plurality of longitudinally extending ribs that are integrally formed from the sheet material. The peripheral regions are free of ribs and may include a densified structure. Also disclosed are a method of producing the foregoing separator, an envelope separator made from the sheet material, and a method of making the envelope separator.

8 Claims, 5 Drawing Sheets

BATTERY SEPARATOR FOR A STORAGE BATTERY

RELATED APPLICATION

This application claims the benefit of earlier-filed, U.S. Provisional Application No. 61/174,030, filed Apr. 30, 2009.

FIELD OF THE INVENTION

The invention relates to a battery separator for a storage battery, to a method for its production, to an envelope separator, and to a method for the production of an envelope separator.

BACKGROUND OF THE INVENTION

Separators currently used in lead acid (or storage) batteries are microporous films of sheet material that prevent shorting between neighbouring electrode plates of opposite polarities and plate material from falling out, but on account of their porous structure permit ionic current flow in the electrolyte. Separators of this kind are known from, for example, U.S. Pat. No. 3,351,495, U.S. Pat. No. 4,927,722, U.S. Pat. No. 5,776,630 and WO 01/13 442 each is incorporated herein by reference. Typical polymers these separators are made from include polyolefins such as high molecular weight polyethylene (e.g., ultra high molecular weight polyethylene, UHMWPE). Such separators are normally provided on at least one side with longitudinal ribs that are intended to prevent direct contact of the sheet material with the positive electrode plate and maintain the spacing between the opposing electrodes. These ribs also lend the separator a certain rigidity in the longitudinal direction. Longitudinal ribs of this kind may also, as described in U.S. Pat. No. 5,679,479 and U.S. Pat. No. 5,789,103 both incorporated herein by reference, consist of a plurality of individual stamped embossments that form a rib structure of alternating ridges and furrows.

Separators are usually manufactured by extrusion of a thermoplastic into a film that is then rolled into a sheet material with the prescribed ribs, after which the pore former, such as mineral oil, is extracted and the sheet material so formed is wound into rolls. This sheet material is later drawn off the roll and cut into strips of the desired width. These strips are cut to the desired length and then folded over either a positive or a negative electrode plate to form an envelope, the two peripheral regions of which can be joined by, for example, heat sealing, pressure welding or other processes that are known per se. Electrode plates are then assembled into groups for a storage battery, plates in separator envelopes alternating with plates of opposite polarity without envelopes. In general, only electrode plates of a single polarity are placed in envelope separators; in special cases, however, electrode plates of both polarities can be placed in envelope separators. The electrode plates within a group are now aligned and then joined together. The alignment of the electrode plates may result in individual electrode plates being pushed to a greater or lesser extent into one or the other peripheral region of an envelope separator. Because the electrode plates frequently acquire pointed tips or sharp edges depending on the manufacturing process, this displacement can cause a point or edge of an electrode plate to puncture the separator material, which in turn can result in shorting with the neighbouring electrode. This is especially the case when the electrode plates used consist of a grid of, for example, expanded or stamped metal into which the actual active material is incorporated, as described for example in EP-A-0 994 518. In such cases it may occur that the expanded material is not cut precisely at the nodes, so that individual grid wires project from the electrode plates, bend slightly on alignment of the electrode plates and puncture the sheet material of the separator.

To avoid, or at least reduce, the risk of puncture by the points, edges or grid wires of the electrode plates, it has been proposed that the peripheral region be designed as a plurality of parallel, concave furrows interspersing a plurality of similarly formed small "mini-ribs" (EP-A-0 899 801, JP 2000-182593, U.S. Pat. No. 6,410,183 each is incorporated herein by reference) and that the ribs between the furrows be broader and with a flat upper surface (WO 00/63983 incorporated herein by reference). It has been shown, however, that in unfavourable cases it is still possible for individual envelope separators to be punctured during alignment of the electrode plates, with the associated risk of shorting. It has also been proposed to design the mini-ribs in the form of a triangle projecting from the level of the sheet material, with the base of the triangle on the sheet material, one side of the triangle facing the inner region and the other side facing the periphery, the side facing the inner region being longer than that facing the periphery.

However, it has been found for the prior art separators that many punctures still occur in the peripheral region with separators having mini-rib configurations.

SUMMARY OF THE INVENTION

In accordance with at least selected embodiments, a battery separator for a lead acid (storage) battery is made from a thermoplastic sheet material. The sheet material has a central region flanked by peripheral regions. The central region includes a plurality of longitudinally extending ribs that are integrally formed from the sheet material. The peripheral regions are preferably free of ribs and may include a densified structure. Also disclosed are a method of producing the foregoing separator, an envelope separator made from the sheet material, and a method of making and using the envelope separator.

It is therefore at least one object of at least one embodiment of the present invention to provide an improved battery separator for a storage battery so as to further reduce the risk of the electrode plates puncturing the sheet material of the separator, and to provide an efficient method for producing such separators.

It is a further object of at least one embodiment of the present invention to provide an improved envelope separator for an electrode plate of a storage battery as well as a method for its production.

It is yet another object of at least one embodiment of the present invention to provide an improved battery separator, an improved method for producing such separators, or an improved method for using such separators.

DESCRIPTION OF THE DRAWINGS

The present invention may be better understood when considering the following description of the invention along with the following drawings which illustrate selected exemplary embodiments of the invention.

DESCRIPTION OF THE INVENTION

Figure 1:
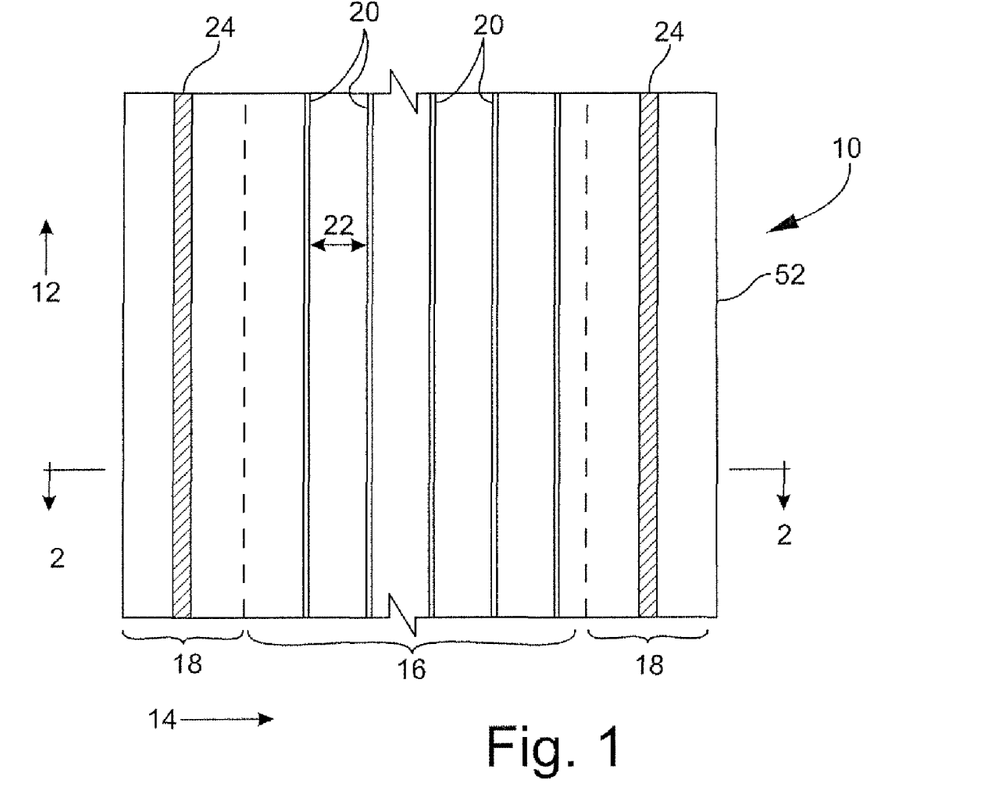
FIG. 1 is a plan view of a battery separator made according to at least one embodiment of the present invention.
Figure 2:
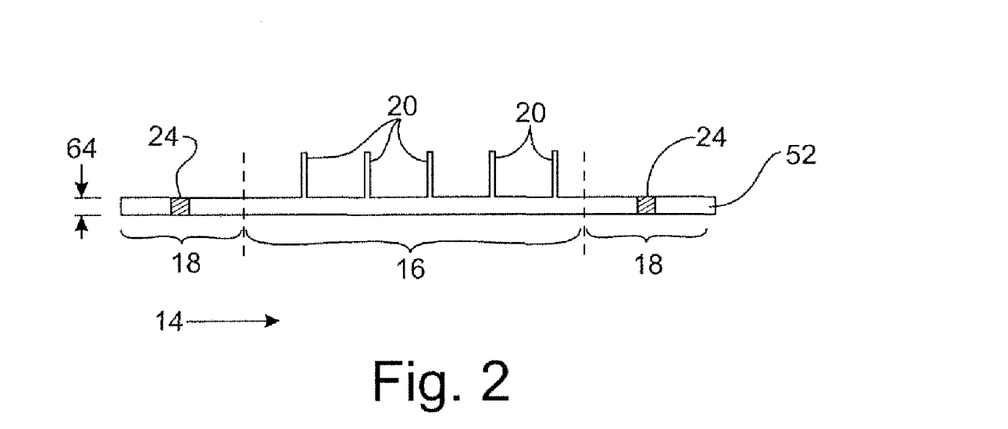
FIG. 2 is a sectional view of the separator shown in FIG. 1 taken along sectional line 2-2.

In accordance with at least one embodiment of the present invention, and as shown in FIGS. 1 and 2, a battery separator 10 for a storage battery, preferably said separator being made of a sheet material 52 being based on a thermoplastic polymer, whereby said battery separator has a longitudinal direction 12 and a width direction 14 and has a central region 16 and in the width direction at its side edges peripheral regions 18 extending in the longitudinal direction. The battery separator 10 has longitudinal main ribs 20 extending in the longitudinal direction and being formed integrally with the sheet material 52 (or back sheet or web) on at least one side of the sheet material 52, the main ribs 20 having a distance 22 with respect to each other, wherein at least the sheet material 52 of the battery separator in its central region 16 has a microporous structure having an average porosity, and wherein the peripheral regions 18 are essentially free from main ribs 20.

In a preferred embodiment, the peripheral regions 18 of the battery separator 10 according to at least selected embodiments of the invention have a densified structure 24 the porosity of which is lower than the porosity of the microporous structure in the central region 16. Especially preferred is a densified structure 24 in the peripheral regions 18 with an average porosity which is at least 10% by volume lower than the average porosity in the central region 16 of the sheet material 52.

It has been shown that for such battery separators 10 having peripheral regions 18 which are essentially free from main ribs 20 puncture of the sheet material 52 by any electrode material can effectively be reduced. It is assumed that this is due to the fact that in the peripheral regions 18 of the separators 10 of the invention there are essentially no catch points for the edges of electrode plate or for sharp gridwire ends of expanded metal grids the electrodes are made from as is still the case e.g. with separators having a mini-rib configuration in the peripheral areas. In addition, the densified structure 24 and the reduced porosity in the peripheral regions 18 may lead to an improvement with respect to puncture resistance. Within the framework of the present invention, essentially free from ribs 20 shall mean that there are no ribs 20 in the peripheral regions 18 of the separators 10 according to the invention like the major ribs 20 in the central region 16 of the separator 10, which typically have a height above the sheet material between the ribs 20 of about 0.3 mm to about 2.0 mm, and no pattern of mini-ribs like the ones of the separators described in the prior art. However, embodiments of the peripheral regions 18 are comprised by the present invention whose surfaces show singular surface protuberances which have a height below 0.05 mm.

Figure 3:
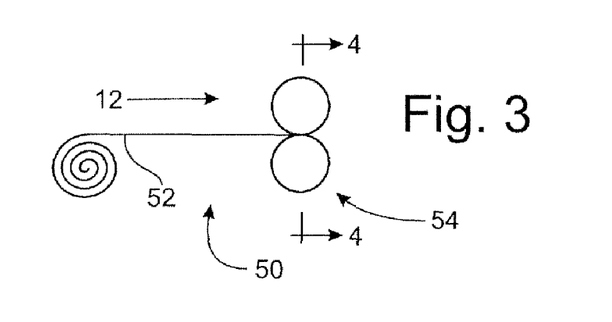
FIG. 3 is a schematic illustration of a process for producing the separator shown in FIG. 1.

In accordance with at least selected embodiments, the invention also relates to a method 50 for producing such a battery separator 10 (FIG. 3), in at least one embodiment, the method comprising the steps:

a) providing a sheet material 52 being made of a thermoplastic polymer and having a longitudinal direction 12 and a width direction and side edges parallel to the longitudinal direction, said sheet material 52 having longitudinal main ribs 20 extending in the longitudinal direction and being formed integrally with the sheet material 52 on at least one side of the sheet material 52, whereby the main ribs 20 have a distance 22 with respect to each other and whereby the sheet material 52 has a macroporous structure having a porosity, b) feeding the sheet material 52 in longitudinal direction 12 into a compression device 54, and c) compressing the sheet material 52 by applying a compressive force uniformly in a peripheral region 18 along each side edge but not in a central region 16 between the peripheral regions 18 to provide a surface of the sheet material 52 in the peripheral regions 18 being essentially free from ribs 20.

Figure 4:
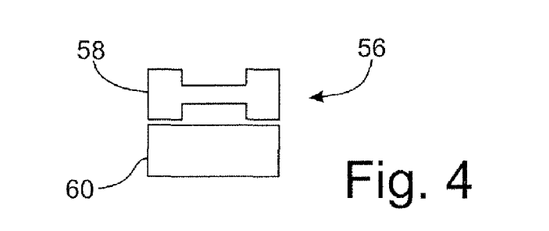
FIG. 4 is a sectional view of the calendaring step illustrated in FIG. 3 and is taken along sectional line 4-4.

With reference to FIG. 4, compressing of the sheet material 52 in the peripheral regions 18 can be done in a calendering process step 56 between pressure rollers 58, 60. Preferably, by the compressing of the sheet material 52 in the peripheral regions 18 in the methods of the invention, the structure in the peripheral regions 18 is densified and the porosity is lowered compared to the average porosity of the macroporous structure of the uncompressed sheet material 52 in the central region 16 between the peripheral regions 18. It is especially preferred if compressing is done such that in the peripheral regions 18 the densified structure 24 has an average porosity which is at least 10% by volume lower than the average porosity in the central region 16 of the sheet material 52.

Typically, the distance 22 (FIG. 1) of the main ribs 20 in the central region 16 of the sheet material 52 varies between about 5 mm and 12 mm. In a preferred embodiment, the width of each peripheral region 18 of the battery separators 10 of the present invention or the peripheral regions 18 resulting in the processes according to the present invention is at least by a factor of 1.5 larger than the average distance between adjacent main ribs 20.

Preferably, the sheet material 52 used within the framework of at least one embodiment the present invention has a thickness 64 (FIG. 2) of about 0.05 to 0.35 mm between the main ribs 20. As a result of the compression, the thickness of the sheet material 52 in the peripheral regions 18 may be slightly thinner or similar depending amongst other things on the mass of the ribs 20 which are removed (flattened) by the compression.

There is no restriction with respect to the pattern of the main ribs 20 extending in the longitudinal direction of the sheet material 52. The sheet material 52 may also have transverse ribs, not shown, like e.g. disclosed in U.S. Pat. No. 5,776,630 (on the same side as main ribs 20) or as in U.S. patent application 61/253,096 (on the back side of sheet 52), each hereby incorporated by reference herein. In addition to the main ribs 20, the sheet material 52 provided in step a) of the process of the present invention may have mini-ribs in areas along its side edges 18.

Figure 5:
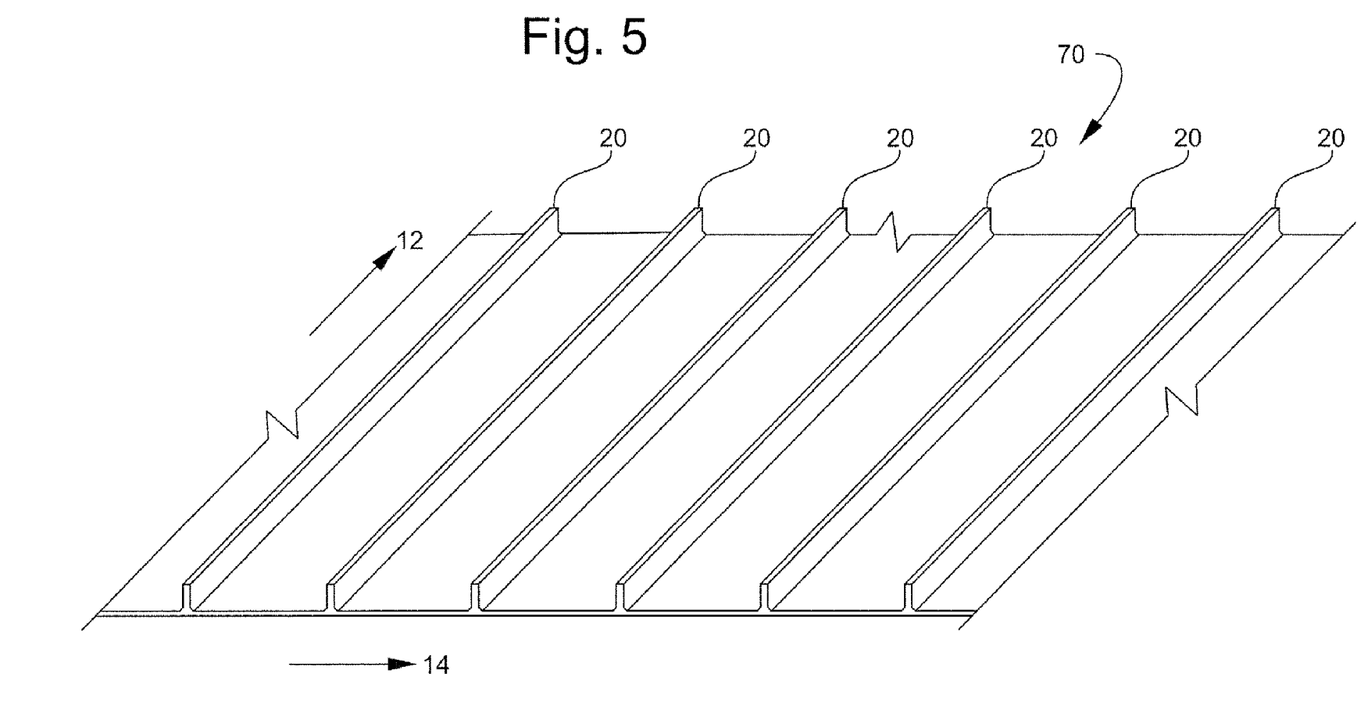
FIG. 5 is a perspective view of a 'universal profile.'

However, in an least selected embodiments, preferably a sheet material 52 is provided in process step a) the main ribs 20 of which all have the same cross section, are equally spaced with respect to each other and are distributed across the entire width 14 of the sheet material 52 (FIG. 5). In step c) in the peripheral regions 18 the main ribs 20 are removed by the compressing of the sheet material 52 whereby a smooth surface is formed in the peripheral regions 18 which are then essentially free from ribs 20 (FIGS. 1 and 2). However, it may happen that during compression step c) ribs 20 initially being present in peripheral regions 18 are not fully removed but small surface protuberances remain in the peripheral regions 18. However, as mentioned above, embodiments of the peripheral regions 18 are comprised by the present invention and are understood to be essentially free from ribs 20 and whose surfaces show singular surface protuberances which have a height below 0.05 mm.

Accordingly, a battery separator 10 is preferred the main ribs 20 of which in the central region 16 all have the same cross section, whereby it is especially preferred that the main ribs 20 are equally spaced 22 with respect to each other.

Figure 6:
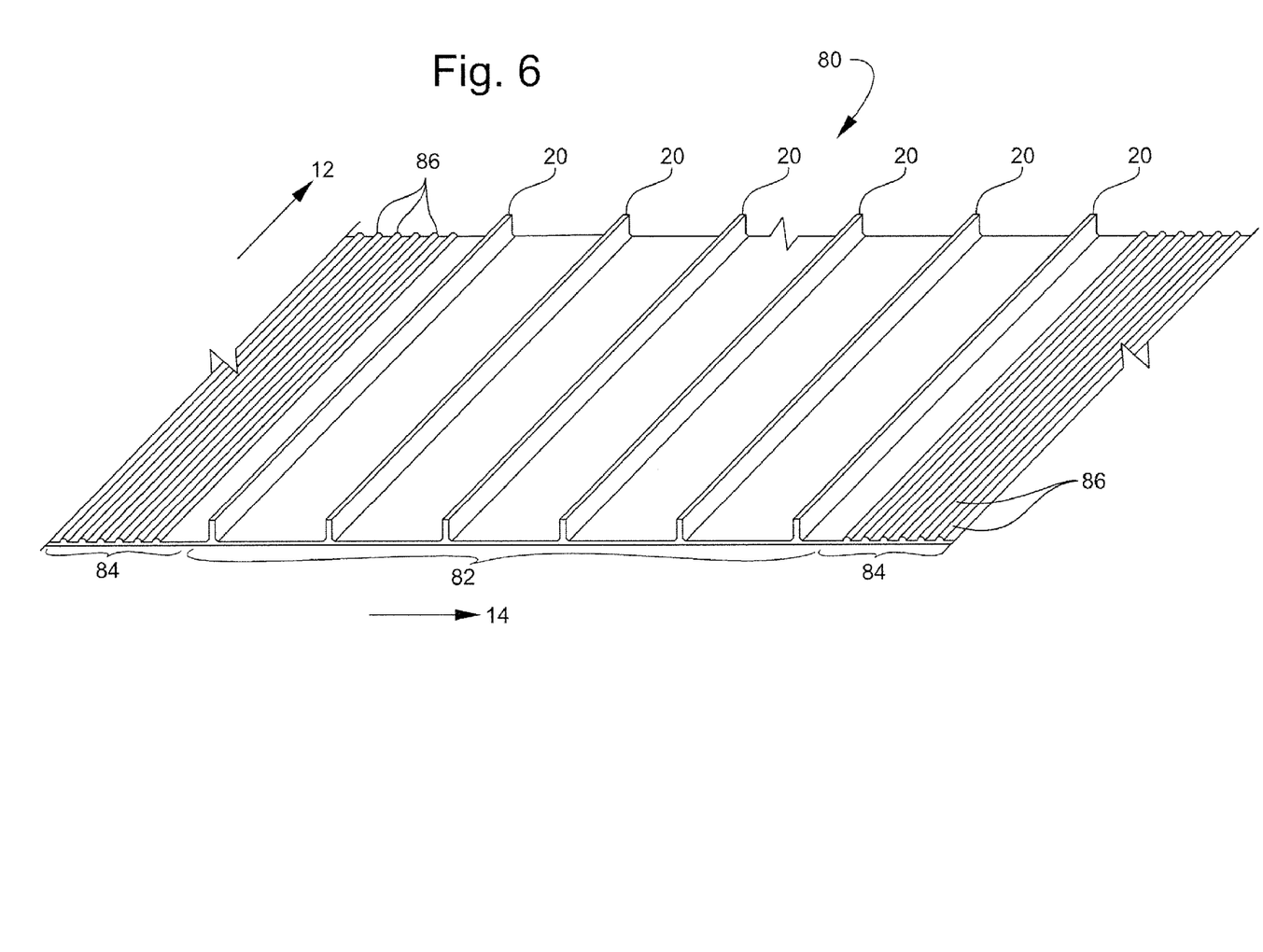
FIG. 6 is a perspective view of a 'panel profile.'

Sheet materials 70 (FIG. 5) having a profile with longitudinal main ribs 20 all having the same cross section, being distributed across the entire width direction 14 of the sheet material 70 and being equally spaced with respect to each other, also known as "universal profile," from an economical point of view with respect to the production processes offer advantages over sheet materials 80 (FIG. 6), having longitudinal main ribs 20 in their central region 82 and mini-ribs 86 in their peripheral regions 84, also known as "panel profiles." Because of the mini-rib 86 areas in the peripheral region 84 panel profiles have to be extruded and manufactured in specific width according to customer requirements. This affords frequent changes in the production processes. In contrast, universal profiles 70 can efficiently be produced in greater widths and sheet materials in widths specified by the customers can be cut from the wide universal profile 70 sheet.

However, it has been proven difficult to produce envelope battery separators for an electrode plate of a storage battery from universal profiles 70 as sealing of the side edges of the envelope separators pose a major problem during production. Especially when using mechanical sealing by compressing the edges into one another between a pair of opposed pressure rolls having gear teeth as e.g. described in U.S. Pat. No. 4,407,063 incorporated herein by reference, the longitudinal main ribs 20 in the peripheral regions 84 lead to deformations of the side edges and rib run-off in the side areas of the envelope. In accordance with at least selected embodiments of the present invention, sheet materials 52 which have been compressed in the peripheral regions 18 along each side edge by applying a compressive force uniformly in these peripheral regions 18 resulting in these regions in a surface being essentially free from ribs 20 led to envelopes separators having straight sealed side edges without rib run-off.

Figure 7:
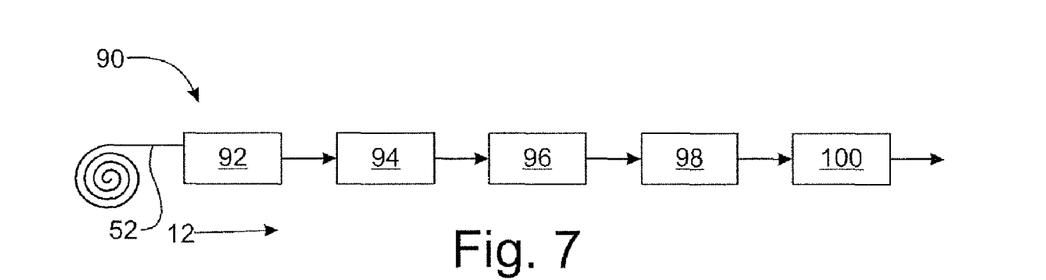
FIG. 7 is a schematic illustration of a process for producing an envelope separator.

Therefore, in addition, at least certain embodiments of the present invention are directed to a method 90 (FIG. 7) for producing an envelope separator for an electrode plate of a storage battery comprising the steps:

a) providing a sheet material 52 being made of a thermoplastic polymer and having a longitudinal direction 12 and a width direction and side edges parallel to the longitudinal direction, said sheet material 52 having longitudinal main ribs 20 extending in the longitudinal direction and being formed integrally with the sheet material 52 on at least one side of the sheet material 52, whereby the main ribs 20 have a distance 22 with respect to each other and whereby the sheet material 52 has a microporous structure having a porosity, b) feeding 92 the sheet material 52 in longitudinal direction into a compression device, c) compressing 94 the sheet material by applying a compressive force uniformly in a peripheral region 18 along each side edge but not in a central region 16 between the peripheral regions 18 to provide a surface of the sheet material 52 in the peripheral regions 18 being essentially free from ribs 20, d) cutting 96 a rectangular section of the so treated sheet material along a line perpendicular to the longitudinal extension of the sheet material 52, e) folding 98 the rectangular section onto itself along a central line, not shown, of the piece rectangular to the main ribs 20 to form two equally sized superimposing halves of the rectangular section, and f) joining and sealing 100 the overlapping side edges.

It is possible to conduct the method 90 according to the invention for production of an envelope separator such that e.g. the sheet material after compressing 94 the peripheral regions may be rolled up on a roll, not shown, as an intermediate product which later on is fed into an enveloping machine for cutting 96, folding 98, and finishing 100 the envelope. It is, however, preferred to integrate the process steps of the method in a single process.

Moreover, at least selected embodiments of the invention relate to an envelope separator 110 (FIG. 8) for an electrode plate of a storage battery, said envelope separator 110 having closed bottom 112, left 114 and right 116 side edges and an open top side 118, the envelope separator 110 comprising a battery separator being made of a sheet material 52 being based on a thermoplastic polymer, whereby the battery separator has a longitudinal direction, a central region 16 and two peripheral regions 18 extending in the longitudinal direction at its side edges and having longitudinal main ribs 20 extending in the longitudinal direction being formed integrally with the sheet material 52 on at least one side of the sheet material 52 and having a distance 22 with respect to each other, wherein the sheet material 52 in the central region 16 has a microporous structure having a porosity, wherein the battery separator is folded onto itself along a line 120 perpendicular to the longitudinal main ribs 20 thereby forming the closed bottom 112 of the envelope separator 110, wherein the overlapping side edges of the battery separator are joined and sealed 100 thereby forming the closed side edges 114, 116 of the envelope separator 110, and wherein the peripheral regions 18 between the longitudinal main ribs 20 and the joined edges 100 are essentially free from ribs 20.

Figure 8:
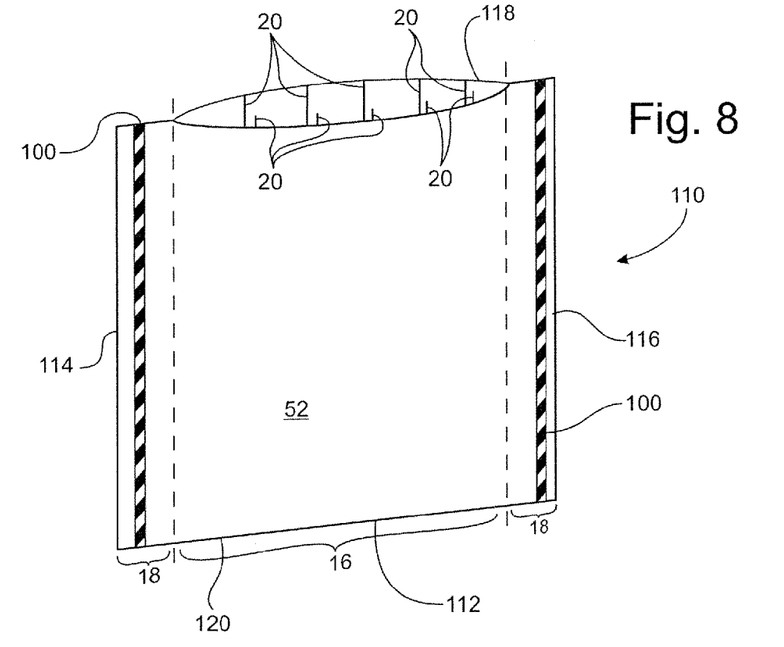
FIG. 8 is a plan view of at least one embodiment of an envelope separator.

There are several methods for sealing 100 the side edges 114, 116 of envelope separators 110 like sealing by adhesives, heat sealing such as ultrasonic, or mechanical sealing. For the envelope separator 110 of the present invention and in the method for its production, it is preferred that the overlapping side edges 114, 116 are mechanical sealed by compressing the edges 114, 116 into one another between a pair of opposed pressure rollers acting as sealing wheels. For ensuring effective compressing of the edges into one another, the pressure rollers preferably have gear teeth as e.g. described in U.S. Pat. No. 4,407,063 incorporated herein by reference.

Figure 9:
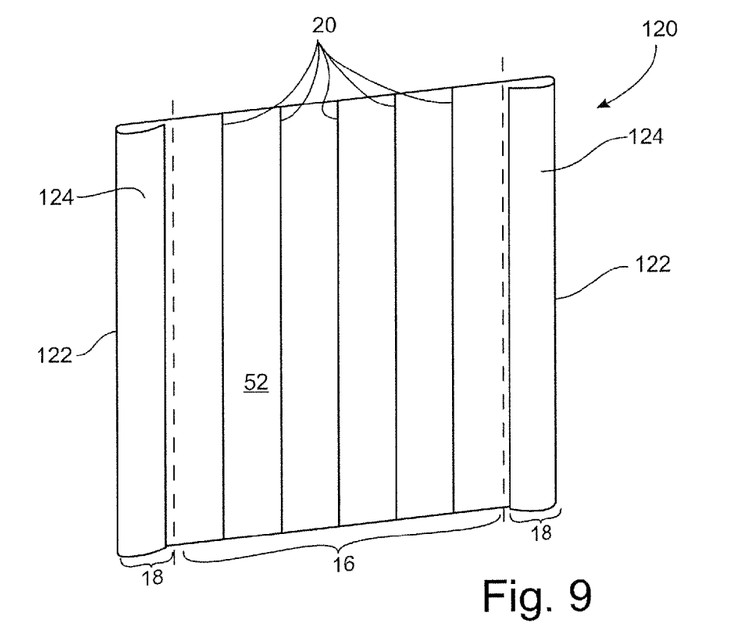
FIG. 9 is a plan view of the sheet material of at least one embodiment of the present invention with lateral edges folded over.

In a preferred embodiment of the invention in the peripheral regions 18 of the battery separator or of the envelope separator 120 (FIG. 9) the battery separator or the sheet material 52 is folded onto itself along a fold line 122 parallel to the side edges. Folding can be done to either side of the battery separator or the sheet material 52 and for the envelope separator 120, the folding can be done inwardly or outwardly. By the folding in the peripheral region 18, a folded over region 124 is formed with a thickness twice that of the unfolded material, which results in a further reduced risk of a perforation of these regions in contact with the edges or grid wires of the electrode plates, i.e. in a further increased puncture resistance.

In the process 50 for producing the battery separator of the invention and in the process 130 (FIG. 10) for producing the envelope separator 120 of the invention the folding 132 may be done after the compressing step 94, c), preferably directly after the compressing. In order to improve the folding, in a preferred embodiment of the methods according to the invention the sheet material 52 in each peripheral region 18 is scored, not shown, along the fold line 122 parallel to the side edges and is then folded onto itself along each fold line.

Figure 10:
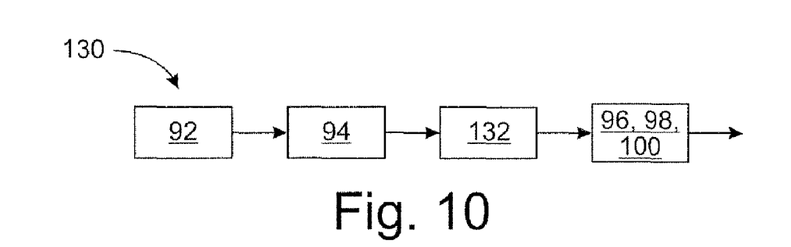
FIG. 10 is a schematic illustration of a process for producing the material shown in FIG. 9.

The folding 132 can be accomplished by methods known in the art for folding sheet-like materials in continuous processes. It is, however, preferred to use gradually developing curved surfaces, i.e. plowshare-type folders like the ones described in U.S. Pat. No. 2,540,844 incorporated herein by reference, or guide bars and crease blades, respectively, like those disclosed in EP-A-0 721 908 incorporated herein by reference.

The sheet material 52 may be stretched at least in the width direction 14. Stretching in the width direction is especially advantageous in cases when the battery separator or the sheet material afterwards is folded onto itself in the peripheral regions in order to compensate for the width reduction by the folding. Moreover, by stretching the microporous structure of the sheet material is oriented in the width direction. Stretching may be done by, for example, a factor of 1.05 to 1.2. Among other things, stretching the material will also have the consequence of increasing the porosity of the bulk of the separator, which in turn will lower the ionic resistance of the separator and ultimately the battery.

In principle, all acid-resistant thermoplastic polymers are suitable for the sheet materials of the separators according to the invention. Preferred thermoplastic polymers are polyvinyl chloride, polyethylene and polypropylene, polyethylene of high molecular weight (e.g., ultra high molecular weight polyethylene, UHMWPE) is particularly preferred. The sheet materials may also be manufactured with the addition of inorganic fillers such as amorphous silicic acid with the composition and manufacture of sheet materials of this type being known from the prior art. Representative formulations may be found in U.S. Pat. Nos. 3,351,495, 5,230,843, and 7,445,735, each is incorporated herein by reference.

A battery separator for a lead acid (storage) battery is made from a thermoplastic sheet material. The sheet material has a central region flanked by peripheral regions. The central region includes a plurality of longitudinally extending ribs that are integrally formed from the sheet material. The peripheral regions are free of ribs and may include a densified structure. Also disclosed are a method of producing the foregoing separator, an envelope separator made from the sheet material, and a method of making the envelope separator.

The present invention may be embodied in other forms without departing from the spirit and the essential attributes thereof, and, accordingly, reference should be made to the appended claims, rather than to the foregoing specification, as indicating the scope of the invention. For example, an improved battery may include a plurality of the battery separators or envelope separators of the present invention.

We claim:

1. A method for producing a battery separator, the battery separator having a central region and side edge peripheral regions, comprising the steps:
   a) providing a single layer of a sheet material being made of a thermoplastic polymer and having a longitudinal direction and a width direction and side edges parallel to the longitudinal direction, said sheet material having longitudinal main ribs extending in the longitudinal direction and being formed integrally with the sheet material on at least one side of the sheet material in the central region and the peripheral regions, whereby the main ribs have a distance with respect to each other and whereby the sheet material has a microporous structure having a porosity,
   b) feeding the single layer of the sheet material in longitudinal direction into a compression device, and
   c) compressing the single layer of the sheet material by applying a compressive force uniformly in the peripheral region along each side edge but not in the central region between the peripheral regions, thereby substantially flattening the main ribs in the peripheral regions to provide a surface of the sheet material in the peripheral regions essentially free from ribs.

2. The method according to claim 1, wherein after compressing the sheet material in the peripheral regions, the sheet material is folded in the peripheral regions onto itself along a fold line parallel to its side edges.

3. The method according to claim 1, wherein after compressing the sheet material in the peripheral regions, the sheet material in each peripheral region is scored along a fold line parallel to the side edges and then folded onto itself along each fold line.

4. A method for producing an envelope battery separator for an electrode plate of a storage battery comprising the steps:
   a) providing a single layer of a sheet material being made of a thermoplastic polymer, having a longitudinal direction and a width direction, and having a central region and peripheral regions at side edges, the peripheral regions being parallel to the longitudinal direction, said sheet material having longitudinal main ribs extending in the longitudinal direction and being formed integrally with the sheet material on at least one side of the sheet material in the central region and the peripheral regions, whereby the main ribs have a distance with respect to each other and whereby the sheet material has a microporous structure having a porosity,
   b) feeding the single layer of the sheet material in longitudinal direction into a compression device,
   c) compressing the single layer of the sheet material by applying a compressive force uniformly in the peripheral region along each side edge but not in the central region between the peripheral regions, thereby substantially flattening the main ribs in the peripheral regions to provide a surface of the sheet material in the peripheral regions essentially free from ribs,
   d) cutting a rectangular section of the so treated sheet material along a line perpendicular to the longitudinal extension of the sheet material,
   e) folding the rectangular section onto itself along a central line of the piece perpendicular to the main ribs to form two equally sized superimposing halves of the rectangular section, and
   f) joining and sealing the overlapping side edges.

5. The method according to claim 4, wherein in step c) the structure in the peripheral regions is densified and the porosity is lowered compared to the porosity of the microporous structure in a central region between the peripheral regions.

6. The method according to claim 4, wherein the overlapping side edges are mechanical sealed by compressing the edges into one another between a pair of opposed pressure rollers acting as sealing wheels.

7. The method according to claim 4, wherein after step c), the sheet material in the peripheral regions the sheet material is folded in the peripheral regions onto itself along a fold line parallel to the side edges of the sheet material.

8. The method according to claim 4, wherein after compressing the sheet material in the peripheral regions, the sheet material in each peripheral region is scored along a fold line parallel to the side edges and is then folded onto itself along each fold line.

* * * * *